United States Patent
Aref et al.

[11] Patent Number: 6,097,422
[45] Date of Patent: Aug. 1, 2000

[54] ALGORITHM FOR FAST FORWARD AND FAST REWIND OF MPEG STREAMS

[75] Inventors: Walid G. Aref, New Brunswick; Sarit Mukherjee, Lawrenceville; Ibrahim Mostafa Kamel, Monmouth Junction, all of N.J.

[73] Assignee: Panasonic Technologies, Inc., Princeton, N.J.

[21] Appl. No.: 09/166,558

[22] Filed: Oct. 5, 1998

[51] Int. Cl.[7] .................................................. H04N 7/173
[52] U.S. Cl. ................................................. 348/7; 709/219
[58] Field of Search .................................... 348/7, 12, 13, 348/6; 455/3.2, 4.2, 5.1; 204/217–219; 386/68

[56] References Cited

U.S. PATENT DOCUMENTS

| | | | |
|---|---|---|---|
| 5,371,532 | 12/1994 | Gelman et al. | 348/7 |
| 5,442,390 | 8/1995 | Hooper et al. | |
| 5,453,779 | 9/1995 | Dan et al. | 348/7 |
| 5,461,415 | 10/1995 | Wolf et al. | 348/7 |
| 5,506,615 | 4/1996 | Awaji | 348/7 |
| 5,521,630 | 5/1996 | Chen et al. | 348/7 |
| 5,596,420 | 1/1997 | Daum | 348/515 |
| 5,606,359 | 2/1997 | Youder et al. | 348/7 |
| 5,648,824 | 7/1997 | Dunn et al. | 348/734 |
| 5,675,693 | 10/1997 | Kagoshima | |
| 5,689,298 | 11/1997 | Nishimura et al. | 348/7 |
| 5,689,299 | 11/1997 | Isono et al. | 348/7 |
| 5,710,970 | 1/1998 | Walters et al. | 455/3.1 |
| 5,720,037 | 2/1998 | Biliris et al. | 348/7 |
| 5,724,646 | 3/1998 | Ganck et al. | 455/4.2 |
| 5,909,238 | 6/1999 | Nagashima et al. | 348/7 |
| 5,922,048 | 7/1999 | Emura | 709/219 |
| 5,928,327 | 7/1999 | Wang et al. | 348/7 |

*Primary Examiner*—Victor R. Kostak
*Attorney, Agent, or Firm*—Harness, Dickey & Pierce, P.L.C.

[57] ABSTRACT

A transport system allows delivery of MPEG video streams from a network server to a media client while avoiding network delays associated with transition between files contained in these streams. A buffering system, a transport controller, and a counter allow buffering and interim delivery of MPEG stream data. The transport controller can either deliver MPEG stream data directly to the media client, or route data through the buffering system. The buffering system includes a population buffer for storage of interim MPEG stream data, and a transport buffer for temporary storage of MPEG stream data during continuous delivery. During transitional delivery, the transport controller delivers interim data to the media client until the requested file is available and uses the counter to select the proper start location in the requested file.

27 Claims, 2 Drawing Sheets

ALGORITHM FOR FAST FORWARD AND FAST REWIND OF MPEG STREAMS

BACKGROUND AND SUMMARY OF THE INVENTION

The present invention generally pertains to transport of MPEG video streams from a network server to a media client. More particularly, the present technique for efficiently performing fast forward and fast rewind operations in response to a user's request. The technique uses buffering and interim transport of MPEG video files contained in these streams to avoid network delays associated with transition between files.

With the explosive popularity of computers and the internet, there is a growing interest in using networks to transport multi-media selections such as video and audio material, to remote locations. Interactive television (ITV), movies on demand, and other multi-media push technologies for example, are among the more promising applications.

Transporting video and audio material typically involves transferring video files from a server over a network which services a number of individual media clients. ITV servers, for example, use a collection of computing, storage, and communications equipment to transfer these files when providing interactive video services. A particular interactive service may require more than one server in order to be implemented, or a server may implement more than one service. The servers generate compressed audio and video streams in standard formats that require decompression only at the location of the media client. Consumers' remote control button-press signals are carried back to the server for interpretation by the service application. In this type of configuration, the media client can view a movie or other type of video much in the same fashion as one would operate a standard VCR.

Due to the size of most video files, it is necessary to stream the files from the server to the media client over the network. There are, however, some data network protocol issues of concern when streaming video. One issue relates to the fact that digital video data streams are very sensitive to delays and transmission errors, which can be caused for various data networking reasons. Also, streaming digital video data usually requires transmission rates which are beyond the bandwidth capabilities of current residential access network technology.

Given a movie stored on disk as an MPEG-based normal play file, an express file represents a shortened version of the normal play file such that only the frames corresponding to fast forward (or fast rewind) play of the movie are stored in the express file. MPEG stream data therefore can include normal play, reverse express, and forward express files which are abbreviated herein as 1X, RX, and FX files, respectively. The idea behind using express files is to save on network and disk bandwidth. Since one frame for every n frames is actually shown to the user during display of fast forward and fast rewind video, it is a waste of bandwidth to ship all the data to the client, including the frames that will be discarded. Express files are therefore built by scanning the normal play file, and selecting every nth frame.

In order to make the selection easier, express files may store in them only the I-frames that appear in the normal play file. I-frames contain information resulting from intraframe coding techniques which exploit the spatial redundancy existing between pictures. In the case of express files, the choice of the value of n will therefore be limited to the size of the group of pictures of the normal play file.

In order for express files to work, some link information must be maintained between the three types of video files. This information helps transition between video files in response to the media client's commands. Each video file has an associated database file with a record for the other video files. For example, the 1X file has a database file with a 1X-FX record, and a 1X-RX record. The database files contain the necessary link information for transition between files. Each record of the file contains fields carrying link pointers to the other database files. The link pointers in the database files are indexed by the frame number of each stream. Once the user requests another file by pressing the fast forward, fast rewind, or play button, the link information allows determination of the next stream that needs to be retrieved and displayed, based on the current frame number in the current stream.

Although the link information guarantees the display of the appropriate sequence of frames, it does not guarantee that the frames will be displayed at the correct time. Simply put, although the correct frames are selected, these frames may experience significant delays before being displayed due to network delays. An undesirable "hiccup" on the screen of the media client is the result of such a delay.

For a more complete understanding of the invention, its objects and advantages, reference may be had to the following specification and to the accompanying drawings.

DETAILED DESCRIPTION OF THE PREFERRED EMBODIMENT

Figure 1:
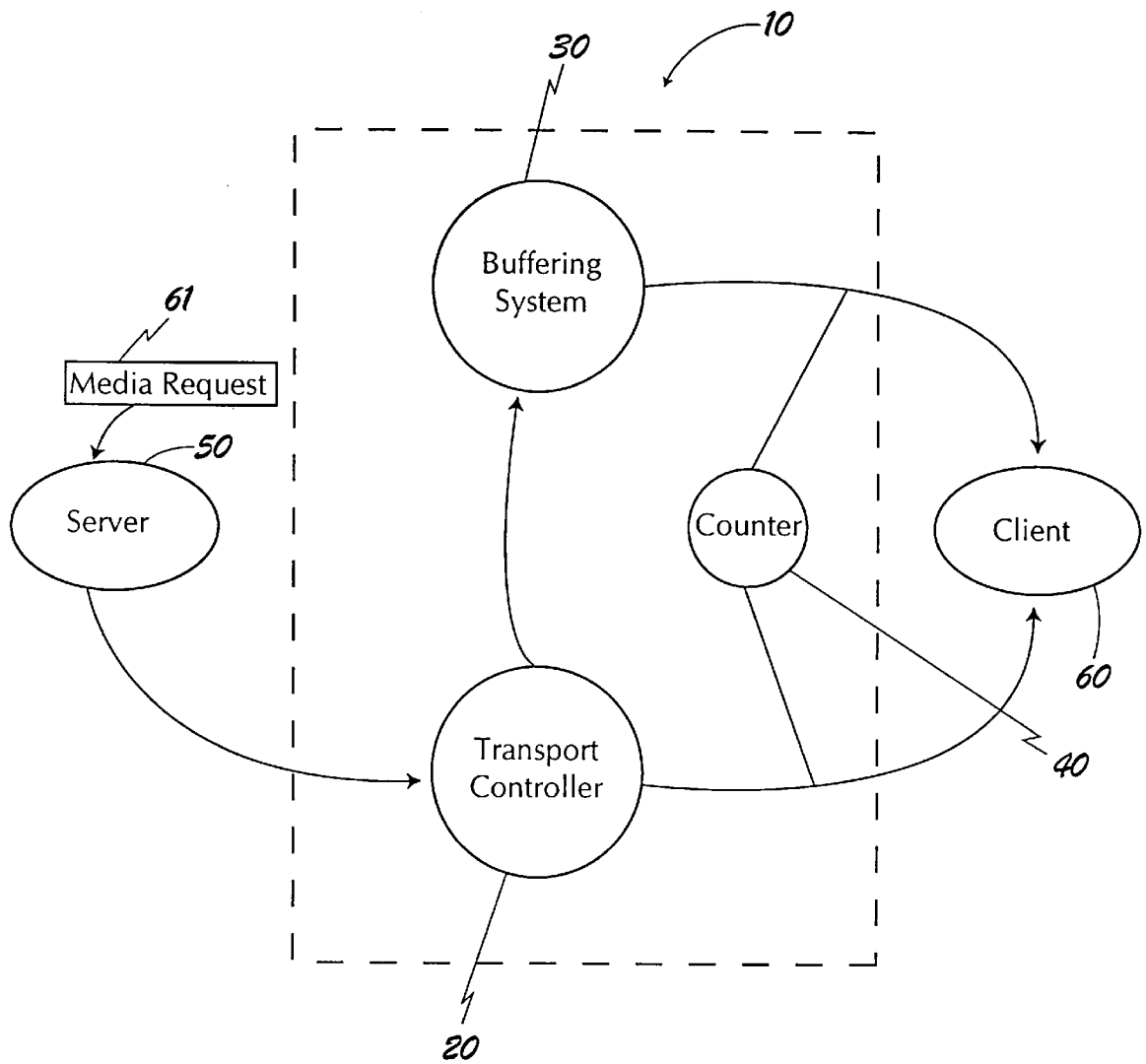
FIG. 1 is a diagram showing system components of a preferred embodiment of the present invention.

Referring to FIG. 1, an exemplary video transport system is illustrated at 10. A transport controller 20, a buffering system 30, and a counter 40 allow the video transport system 10 to deliver MPEG stream data 80 from a network server 50 to a media client 60 in response to one or media requests 61 from the media client 60. The media request 61 sets the delivery state of the video transport system 10 to either continuous delivery or transitional delivery. The presently preferred implementation is in software in which the buffering system and counter are data structures maintained by the client.

Figure 2:
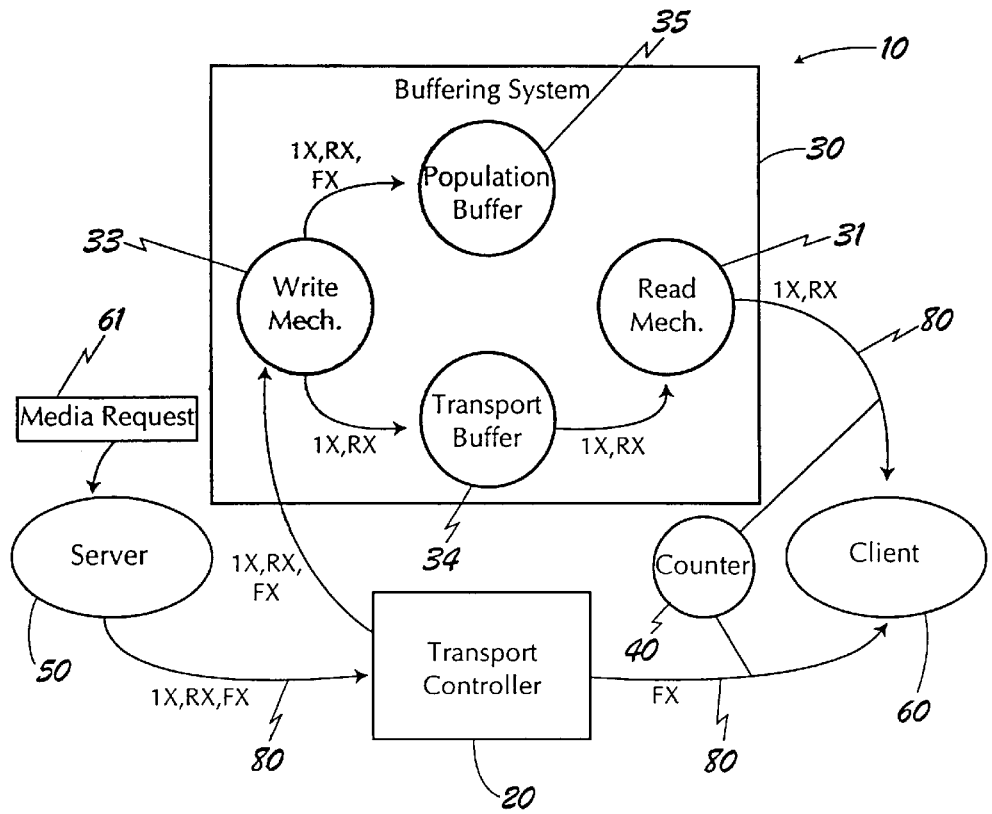
FIG. 2 is a dataflow diagram showing continuous delivery of MPEG video files in accordance with the preferred embodiment of the present invention.
Figure 3:
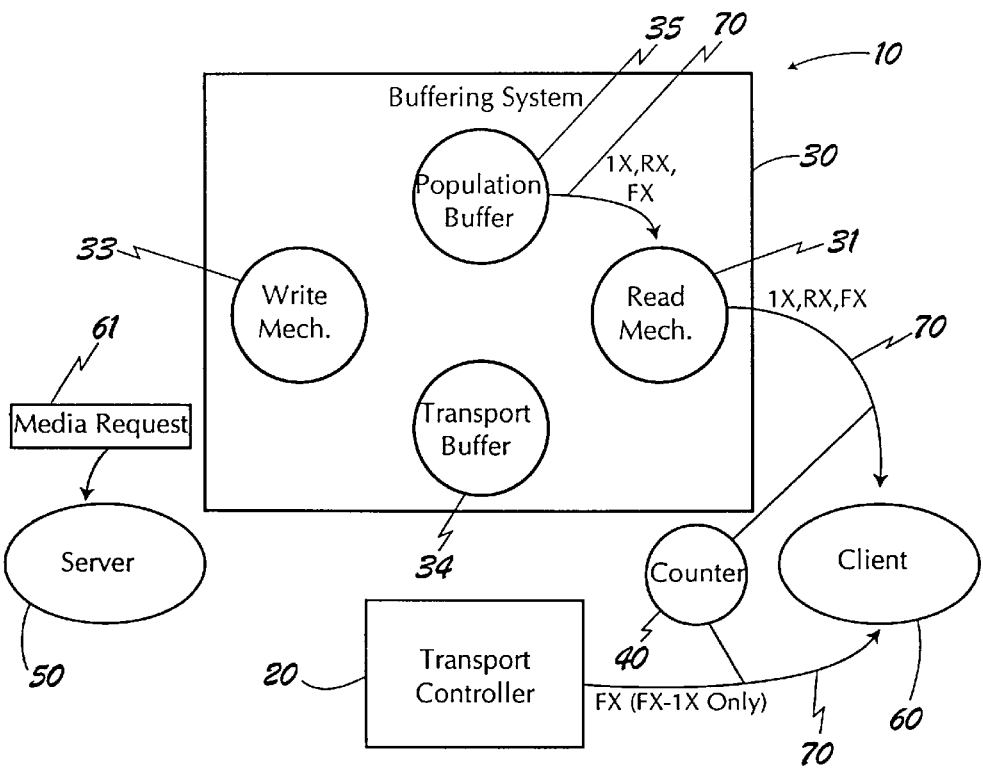
FIG. 3 is a dataflow diagram showing transitional delivery of MPEG video files in accordance with the preferred embodiment of the present invention.

As shown in FIGS. 2 and 3, the present invention generally uses the continuous delivery state as an opportunity to write MPEG stream data 80 to a population buffer 35 in the buffering system 30 for later retrieval during transitional delivery. Continuous delivery means that the media client has not made a request since the video transport system 10 began delivering the last requested file, whereas transitional delivery means that the media client has requested delivery of a different file from the one currently being delivered. The video transport system 10 therefore operates in the continuous delivery state when delivering 1X, FX, or RX files to the media client 60. Likewise, when the media client 60 requests for the server to switch from the current file to a requested file, the video transport system 10 operates in the transitional delivery state. The video transport system 10, therefore enables the delivery of the above mentioned files as well as efficient execution of the following file transitions: FX-1X, 1X-FX, RX-FX, RX-1X, FX-RX, and 1X-RX.

During continuous delivery the MPEG stream data 80 comprises one of the above files, whereas during transitional delivery the MPEG stream data 80 comprises a current file, interim I-frames to be discussed below, and a subsequent requested file.

The counter 40 tracks the number of I-frames delivered to the media client 60. While the content of data actually received by the media client 60 may vary as requests are made, the video transport system 10 guarantees that countable I-frames are contained in such data. The counter 40, therefore, tracks I-frames delivered during both continuous delivery and transitional delivery. Thus, as 1X and FX files are delivered to the media client 60, counter 40 increments with each I-frame, and as RX files are delivered to the media client 60, counter 40 decrements with each I-frame. Through additional counter adjustment to be described below, the video transport system 10 can also execute more complex file transitions. The transport controller 20 can therefore route the MPEG stream data 80 from the server 50 to the media client 60, based on the delivery state and the counter 40.

Generally, the buffering system 30 stores MPEG stream data 80. The client maintains a plurality of buffer spaces that function as a play buffer, a fast forward buffer and a fast rewind buffer. The play buffer contains the frame data that corresponds to the normal play file (the 1X file). The fast forward buffer contains data that is relevant to fast forward playing. This data is continuously cached to facilitate the switch to fast forward. The fast rewind buffer contains data that is relevant to fast rewind playing. This data is continuously cached to facilitate the switch to fast rewind. Specifically, the buffering system 30 has a buffer write mechanism 33 for storing the MPEG stream data 80 in either a transport buffer 34, a population buffer 35, or both, depending on the delivery state of the video transport system 10 and the file. The buffering system 30 also has a buffer read mechanism 31 for reading MPEG stream data 80 from the transport buffer 34, and for reading interim I-frames 70 from the population buffer 35. Note that these interim I-frames 70 are stored during continuous delivery. Preferably, the buffer read mechanism 31 can also deliver data to the media client 60, and the data can be stored in and retrieved from buffers 34 and 35 as either I-frames or complete files. It is important to note that if desired, the media client software can perform the data retrieval functions. Other commonly known techniques can also be used to effect storage and retrieval of buffered data.

During continuous delivery, the transport controller 20 effects delivery of data to the media client 60 by routing 1X and RX files through the transport buffer 34, and FX files directly to the medial client 60. Thus, if the media request 61 comprises a request to deliver an FX file the MPEG stream data 80 comprises the FX file, and the transport controller 20 routes I-frames contained in the FX file to the buffer write mechanism 33 for storage, and directly to the media client 60 for viewing. If the media request comprises a request to deliver a 1X file, the transport controller 20 routes the complete 1X file to the buffer write mechanism 33 for storage and viewing by way of transport buffer 34 and buffer read mechanism 31. Finally, If the media request 61 comprises a request to deliver an RX file, the transport controller 20 routes I-frames contained in the RX file to the buffer write mechanism 33 for storage and viewing by way of transport buffer 34 and buffer read mechanism 31.

Transitional delivery typically involves delivery of interim I-frames 70 until the requested file is available. If the media request 61 comprises a request to transition from delivery of an FX file to delivery of a 1X file, however, the transport controller 20 delivers interim I-frames 70' contained in the MPEG stream data 80 directly to the media client 60 in slow motion speed without accessing data contained in the population buffer 35. During all other transitions, the buffer read mechanism 31 delivers interim I-frames 70 contained in the population buffer 35 to the client 60 until the requested file is available. Interim delivery of buffered MPEG stream data allows the video transport system 10 to avoid the common problems associated with networking delays. For example, when the media request 61 comprises a request to transition from delivery of a 1X file to delivery of a FX file, the MPEG stream data 80 comprises both the 1X file and the FX file. In such case, the buffer read mechanism 31 delivers the interim I-frames 70 contained in the population buffer 35 to the media client 60 in fast forward speed until the FX file is available. Fast forward speed simulation is required for the 1X-FX and 1X-RX transitions, while slow motion simulation is required for FX-1X and RX-1X transitions.

In order to properly transition from one file to the next, the transport controller 20 uses the counter 40 to select a start location in the requested file. Whenever the video transport system 10 is transitioning to or from the delivery of an RX file, the transport controller 20 adjusts the counter 40 in relation to the number of interim I-frames 70 delivered to the media client 60 from the population buffer 35. This adjustment is due to multiple delivery of the same frames. Specifically, when the media request 61 is a request to transition to delivery of an RX file, the transport controller 20 reduces the value of the counter 40 by the number of interim I-frames 70 delivered, and when the media request 61 is a request to transition from delivery of an RX file, the transport controller 20 increases the value of the counter 40 by the number of interim I-frames 70 delivered. No counter adjustment is necessary for the FX-LX and 1X-FX transitions.

SUMMARY OF ALGORITHM

The Normal Play Mode

During normal play mode, the following actions are taken:

1. The file 1X is continuously transmitted from the server to the client normal play buffer $b_p$.

2. The client software reads data from $b_p$ and plays the movie.

3. The I frames are detected and the counter $c_i$ is incremented.

4. The locations of the I frames are detected in $b_p$ as they are loaded and the I frames are copied to the fast rewind buffer $b_r$ in the reverse order (i.e., in a stack manner).

The 1X to FF Transition

When the client presses the fast forward button, the transition from the file 1X to the file FX takes place. During this transition, the following actions take place:

1. The value of $c_i$ is used to determine where to start in the file FX.

2. In the meantime, the frames in $b_p$ are played in the fast forward speed.

3. The I frames (whether from 1X or FX) are copied to $b_r$ in the reverse order.

The Fast Forward Mode

During fast forward, the following actions are performed:

1. Data pages are continuously retrieved from the file FX. These mainly contain I frames.
2. The I frames are played from FX as they are retrieved.
3. $c_i$ is incremented as the I frames are loaded.
4. I frames are stored in br in reverse order.

The FF to 1X Transition

1. The value of $c_i$ is used to switch to the file 1X at the appropriate location.
2. The I frames of FX are played in slow motion speed. This simulates the normal play speed.
3. Playing from $b_p$ is resumed once pages are retrieved from the file 1X.

The 1X to FR Transition

1. The value of $c_i$ is adjusted to be $c_i$–the number of I frames in $b_r$.
2. The updated value of $c_i$ is used to retrieve the appropriate frames from the file RX.
3. In the meantime the I frames in $b_r$ are played.

The Fast Rewind Mode

During fast rewind, the following actions are performed:

1. Data pages are continuously retrieved from the file RX and stored into $b_r$. These mainly contain I frames.
2. The I frames are played from $b_r$ as they are retrieved.
3. $c_i$ is decremented as the I frames are loaded.
4. I frames are stored in $b_f$ in reverse order.

The FF to FR Transition

1. If there exists some data in the buffer pool br these are played first.
   (a) The value of $c_i$ is adjusted to be $c_i$–the number of I frames in $b_r$ if any.
   (b) The updated value of $c_i$ is used to retrieve the appropriate frames from the file RX.
   (c) In the meantime the I frames in $b_r$ are played.
2. Using the value of $c_i$, the appropriate frames data is retrieved from the file RX.
3. As I frames are played, they are copied to the buffer $b_f$ in reverse order.

The FR to 1X Transition

1. The value of $c_i$ is adjusted to be $c_i$+the number of I frames in $b_f$, if any.
2. The updated value of $c_i$ is used to retrieve the appropriate frames from the file 1X.
3. In the meantime the I frames in $b_f$ are played in slow motion.
4. Once data from 1X is retrieved, it is stored in $b_p$, and normal play resumes from $b_p$ once frames in $b_f$ are all played.
5. Frames from $b_f$ are played in slow motion.

The FR to FF Transition

1. If there exists some data in the buffer pool $b_f$, these are played first.
   (a) The value of $c_i$ is adjusted to be $c_i$+the number of I frames in $b_f$, if any.
   (b) The updated value of $c_i$ is used to retrieve the appropriate frames from the file FX.
   (c) In the meantime the I frames in $b_f$ are played.
2. Using the value of $c_i$, the appropriate frames data is retrieved from the file FX.
3. As I frames are played, they are copied to the buffer $b_r$ in reverse order.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. A transport system for delivering MPEG stream data to a media client in response to a media request wherein said media request sets a delivery state of said transport system and said MPEG stream data contains I-frames, comprising:
   a counter for tracking the position in the MPEG stream data of predetermined frames of data that are delivered, such that the counter is decremented during a rewind play mode;
   a buffering system for storing said MPEG stream data; and
   a transport controller for routing said MPEG stream data to said media client based on said delivery state and said counter.

2. The transport system of claim 1 wherein said media request sets said delivery state to transitional delivery.

3. The transport system of claim 2 wherein:
   said media request comprises a request to transition from delivery of a forward express file to delivery of a normal play file such that said MPEG stream data comprises said forward express file and said normal play file, and said transport controller delivers interim I-frames contained in said forward express file to said media client in slow motion until said normal play file is available.

4. The transport system of claim 2 wherein said buffering system comprises:
   a population buffer, said population buffer containing interim I-frames; and
   a buffer read mechanism for reading said interim I-frames and delivering said interim I-frames to said media client.

5. The transport system of claim 4 wherein:
   said media request comprises a request to transition from delivery of a normal play file to delivery of a forward express file such that said MPEG video data comprises said normal play file and said forward express file; and
   said buffer read mechanism delivers said interim I-frames contained in said population buffer to said media client in fast forward speed until said forward express file is available.

6. The transport system of claim 4 wherein said transport controller adjusts said counter in relation to a number of said interim I-frames delivered to said media client from said population buffer.

7. The transport system of claim 6 wherein said media request comprises a request to transition to delivery of a rewind express file, and said transport controller reduces said counter by said number of said interim I-frames.

8. The transport system of claim 7 wherein:
said media request further comprises a request to transition from delivery of a normal play file such that said MPEG stream data comprises said normal play file and said reverse express file; and
said buffer read mechanism delivers said interim I-frames contained in said population buffer to said media client in fast forward speed until said reverse express file is available.

9. The transport system of claim 7 wherein:
said media request further comprises a request to transition from delivery of a forward express file such that said MPEG stream data comprises said forward express file and said reverse express file; and
said buffer read mechanism delivers said interim I-frames contained in said population buffer to said media client until said reverse express file is available.

10. The transport system of claim 6 wherein said media request comprises a request to transition from delivery of a rewind express file, and said transport controller increases said counter by said number of said interim I-frames.

11. The transport system of claim 10 wherein:
said media request further comprises a request to transition to delivery of a normal play file such that said MPEG stream data comprises said reverse express file and said normal play file; and
said buffer read mechanism delivers said interim I-frames contained in said population buffer to said media client in slow motion until said normal play file is available.

12. The transport system of claim 10 wherein:
said media request further comprises a request to transition to delivery of a forward express file such that said MPEG stream data comprises said reverse express file and said forward express file; and
said buffer read mechanism delivers said interim I-frames contained in said population buffer to said media client until said forward express file is available.

13. A transport system for delivering MPEG stream data to a media client in response to a media request wherein said media request sets a delivery state of said transport system to continuous delivery and said MPEG stream data contains I-frames, comprising:
a counter for tracking a number of delivered I-frames;
a buffering system for storing said MPEG stream data; and
a transport controller for routing said MPEG stream data to said media client based on said delivery state and said counter.

14. The transport system of claim 13 wherein said buffering system comprises:
a population buffer; and
a buffer write mechanism for storing said MPEG stream data in said population buffer.

15. The transport system of claim 14 wherein:
said media request comprises a request to deliver a forward express file such that said MPEG stream data comprises said forward express file; and
said transport controller routes said I-frames contained in said forward express file to said buffer write mechanism and directly to said media client.

16. The transport system of claim 14 wherein said buffering system further comprises:
a transport buffer for receiving said MPEG stream data from said buffer write mechanism; and
a buffer read mechanism for reading said MPEG stream data contained in said transport buffer and delivering said MPEG stream data to said media client.

17. The transport system of claim 16 wherein:
said media request comprises a request to deliver a normal play file such that said MPEG stream data comprises said normal play file; and
said transport controller routes said normal play file to said buffer write mechanism.

18. The transport system of claim 16 wherein:
said media request comprises a request to deliver a reverse express file such that said MPEG stream data comprises said reverse express file; and
said transport controller routes said I-frames contained in said reverse express file to said buffer write mechanism.

19. A method for delivering MPEG stream data to a media client in response to a media request wherein said media request sets a delivery state and said MPEG stream data comprises I-frames, comprising:
tracking a number of delivered I-frames;
storing interim I-frames of said MPEG stream data in a population buffer; and
routing said MPEG stream data to said media client based on said delivery state and said number of delivered I-frames.

20. The method of claim 19 wherein said media request sets said delivery state to transitional delivery.

21. The method of claim 20 wherein:
said media request comprises a request to transition from delivery of a forward express file to delivery of a normal play file such that said MPEG stream data comprises said forward express file and said normal play file; and
said routing step comprises delivering interim I-frames contained in said forward express file in slow motion until said normal play file is available.

22. The method of claim 20 wherein said population buffer wherein said routing step comprises delivering said interim I-frames to said media client.

23. A method for delivering MPEG stream data to a media client in response to a media request wherein said media request sets a delivery state of said transport system to continuous delivery and said MPEG stream data comprises I-frames, comprising:
tracking a number of delivered I-frames;
storing said MPEG stream data in a population buffer; and
routing said MPEG stream data to said media client based on said delivery state and said number of delivered I-frames.

24. The method of claim 23 wherein said media request comprises a request to deliver a forward express file such that said MPEG stream data comprises said forward express file, wherein said routing step comprises:
routing said I-frames contained in said forward express file to said population buffer; and
routing said I-frames contained in said forward express file directly to said media client.

25. The method of claim 23 wherein said routing step comprises:
storing said MPEG stream data in a transport buffer;

reading said MPEG stream data contained in said transport buffer; and delivering said MPEG stream data to said media client.

26. The method of claim 25 wherein said media request comprises a request to deliver a normal play file such that said MPEG stream data comprises said normal play file.

27. The method of claim 25 wherein said media request comprises a request to deliver a reverse express file such that said MPEG stream data comprises said I-frames contained in said reverse express file.

* * * * *